M. C. SCHWEINERT & H. P. KRAFT.
INFLATING DEVICE FOR PNEUMATIC TIRES OR THE LIKE.
APPLICATION FILED AUG. 10, 1910.
1,115,978.
Patented Nov. 3, 1914.
2 SHEETS—SHEET 1.
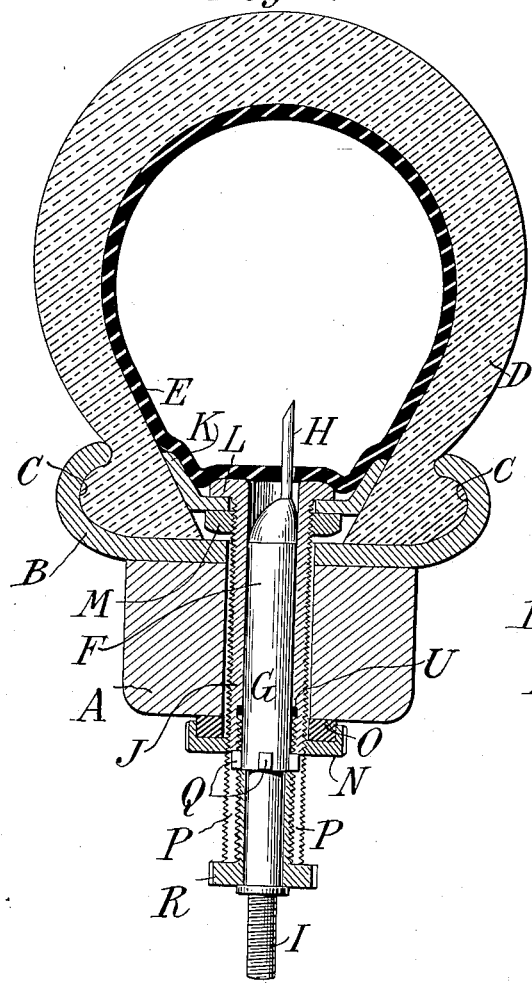
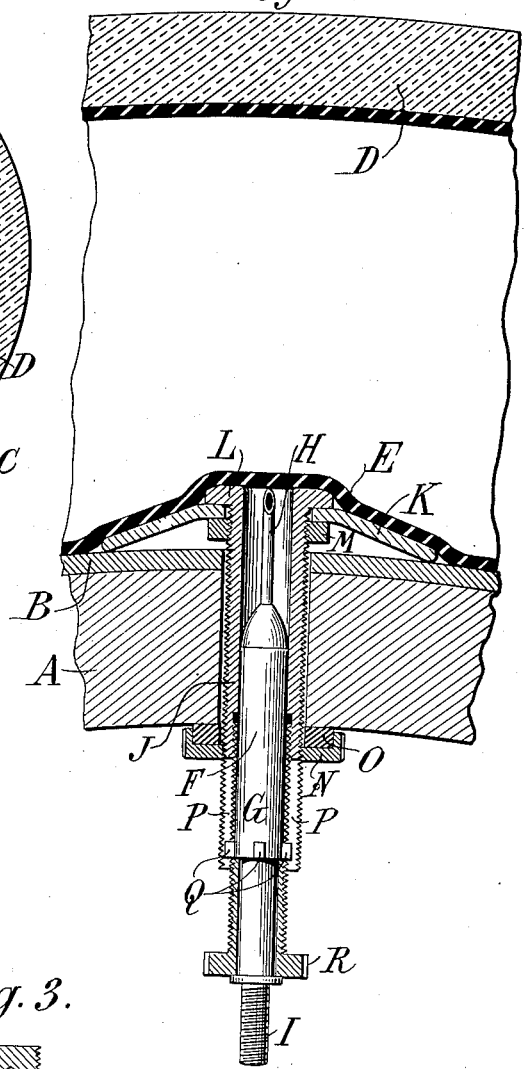
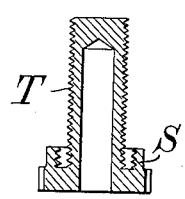
WITNESSES:
INVENTORS:
Maximilian Charles Schweinert,
and Henry P. Kraft,
By Attorneys, M. C. SCHWEINERT & H. P. KRAFT.
INFLATING DEVICE FOR PNEUMATIC TIRES OR THE LIKE.
APPLICATION FILED AUG 10, 1910.
1,115,978.
Patented Nov. 3, 1914.
2 SHEETS—SHEET 2.
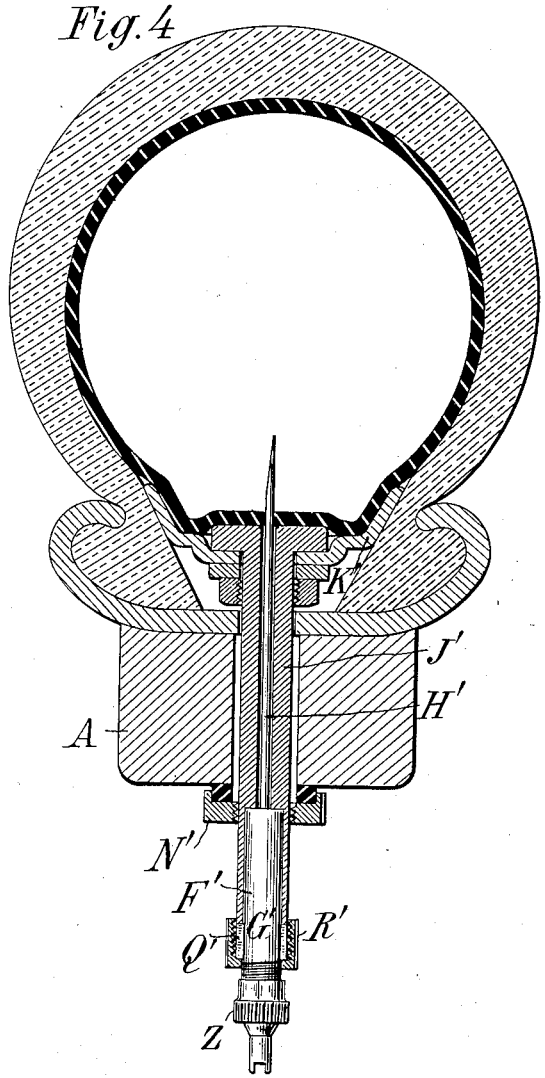
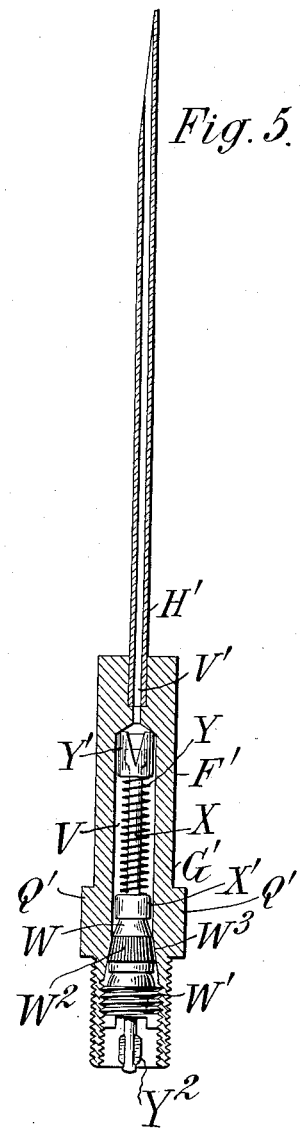
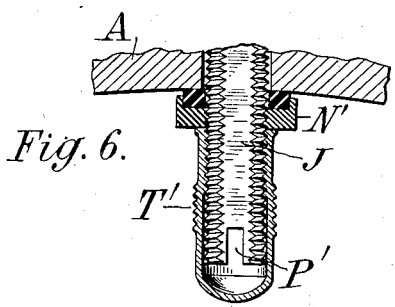
WITNESSES:
Fred White
René Bruine
INVENTORS:
Maximilian Charles Schweinert,
and Henry P. Kraft,
By Attorneys,
Fraser Myers

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

INFLATING DEVICE FOR PNEUMATIC TIRES OR THE LIKE.

1,115,978.  Specification of Letters Patent.  Patented Nov. 3, 1914.

Application filed August 10, 1910. Serial No. 576,584.

*To all whom it may concern:*

Be it known that we, MAXIMILIAN CHARLES SCHWEINERT, residing in West Hoboken, county of Hudson, and State of New Jersey, and HENRY P. KRAFT, residing in Ridgewood, in the county of Bergen and State of New Jersey, both citizens of the United States, have invented certain new and useful Improvements in Inflating Devices for Pneumatic Tires or the like, of which the following is a specification.

This invention relates to inflating devices for what are known as "valveless pneumatic tires" and aims to provide certain improvements therein. In this type of tire the inner tube is so constructed that it is at least to a certain extent self-healing, which characteristic permits its inflation through the medium of a needle-like tube which is inserted through the wall of the tire tube. In this type of tire the inner edges of the outer shoe are separated to permit the passage of the inflating instrument between them so that the latter may pierce the inner tube without passing through the shoe.

The invention provides a fitting which is formed with a passage for the inflating needle, and which at the same time preferably acts as a stay-bolt for holding the edges of the outer shoe in place upon the rim and for preventing creeping of the tire.

The invention also includes the combination with a fitting of this type of an inflating needle, the fitting and needle having interengaging provisions by which the needle can be held in place in the fitting, and preferably also by which the needle can be easily and progressively inserted in the inner tube and withdrawn.

The invention also includes means whereby the needle is rigidly held from turning while within the fitting so that it cannot strain the tube or enlarge the hole through which it passes to such an extent as to prevent self-healing of the tube.

Other features of improvement will be hereinafter referred to.

Referring to the accompanying drawings which illustrate one form of the invention,—Figure 1 is a cross section of the tire provided with one embodiment of the invention, and showing the needle inserted. Fig. 2 is a circumferential section of tire showing the needle about to be inserted. Fig. 3 is a diametrical view of a dust cap. Fig. 4 is a view similar to Fig. 1, showing another form of the invention. Fig. 5 is an enlarged view of the inflating needle illustrated in Fig. 4. Fig. 6 is a detail view showing a form of cap.

Referring to the drawings let A indicate a felly of a wheel which is provided with a metal rim B having side channels C C designed to receive flanges formed on the inner edges of the tire shoe D. Within the tire shoe is an inner air tube E which may be understood to be a tube of the self-healing type. In this class of tubes the construction is such that when punctured by a small object the edges of the puncture close together so that air does not escape to any material extent. This is particularly true when the object is round and pointed so that the cut is not irregular or jagged. Such tubes are designed not only for preventing deflation of the tire while on the road but also for the purpose of avoiding the use of valves connected with the tube, the latter being inflated as before stated by introducing air under pressure through a device which is not unlike a hypodermic needle. Such a device is indicated in the drawings by the reference letter F and comprises a body portion or casing G having within it a check valve of any suitable construction and a sharpened tube H of small diameter through which the air is introduced into the tire. The interior construction of the needle F is preferably that shown in Fig. 5.

According to the invention a tubular member J is provided, which tubular member extends through the felly A of the wheel, and is of proper internal diameter to receive the needle G and to hold it snugly in its varying positions therein. The tube J is preferably constructed as a stay-bolt; that is to say, it is provided at its inner end with a wedge-shaped member K, the sides of which press against the inner sides of the shoe D and hold the flanges of the latter in the channels C of the rim and prevent creeping of the shoe therein. The wedge-shaped member K may be connected with the tube in any suitable manner, but it is preferable to provide an integral flange or head L upon the tube against which the member K is clamped by a nut M. The exterior of the tube J is screw-threaded, at least for a part of its length, and a clamping nut N is provided which is adapted to screw down against the inner side of the felly and to draw the tube J toward the center of the wheel until the member K is in its proper clamping position. A leather washer O is preferably interposed between the nut and the inner face of the felly A as is customary.

The piercing tube H of the needle is preferably arranged eccentrically as shown, in order that the tube may be pierced at different points in the successive inflating operations. By this means there is not so great a tendency to enlarge the hole as though a centrally arranged piercing tube were employed and were always inserted in the same place.

The invention includes means for holding the needle against a rotating or twisting movement, while in the tube J, so that once the needle is inserted it cannot be twisted or turned so as to enlarge the hole in the tire tube. The preferred construction is that illustrated wherein the tube J is formed with a series of slots P, which are adapted to be engaged by a projection or projections Q formed upon the casing G of the needle F. By this means the needle may be inserted in as many positions as there are slots, and consequently the holes made in the inner tubes will be distributed.

The invention also preferably includes a means for holding the needle in place during the inflating operation, so that it need not be held in by hand. The means shown for accomplishing this result comprise a coupling R which is carried by the needle, such coupling being adapted to engage an interior screw-thread on the tube J when the needle is in its proper position. Preferably also means are provided whereby the needle can be accurately and easily pushed through the tire tube and withdrawn therefrom. To this end the coupling R instead of being only sufficiently long to engage the tube J when the needle is in its operative position is made with an extended body portion so that it is enabled to engage the threads of the tube J before the piercing tube H of the needle enters the tube E. This position of the parts is shown in Fig. 2. When the coupling is rotated in one direction the needle is pushed forwardly to pierce the tube E, while by reverse movement of the coupling the needle is withdrawn.

During running of the car it is desirable to provide a cap to prevent ingress of dust and mud into the tube J. In Fig. 3 we have shown a form of cap S designed for this purpose. The cap is provided with a body portion T of sufficient length to extend inwardly beyond the slots P P. A suitable packing may be provided if desired such as the ring U (Fig. 1) which the inner end of the cap engages.

In Fig. 4 another form of the invention is shown. In this figure the needle F' is provided with a concentrically-arranged piercing tube H'. As the needle can occupy but one position in the tube J', it may be provided throughout most of its length with a bore which is only of sufficient diameter to accommodate the tube H'. The outer end of the tube is enlarged to receive the body portion G' and is provided with slots P' into which two lugs Q' of the inflating needle fit. The parts are held together by a short coupling R' which screws on the outer side of the tube J'. The nut N' is used as before to clamp the wedge K' in position so that the edges of the tire cannot escape and the tire as a whole is prevented from creeping.

In Fig. 6 we have shown a different form of dust cap from that illustrated in Fig. 3. In this construction the dust cap T' is of elongated form and is adapted to screw down over the exposed end of the tube J' until its end engages the nut N', thus not only closing the opening to the tube J' but also forming a lock nut on the nut N'.

The form of inflating needle which we prefer to employ is shown in Fig. 5. In this construction the body portion G' is formed with a central bore V within which is fitted a valve of the well-known Schrader type, the valve seat W of which is held in the bore by a screw-threaded plug W', the valve seat being provided with a packing ring $W^2$ seating against a shoulder $W^3$. A valve stem X, carrying a valve proper X', extends through the plug W' and is surrounded by a spring Y which normally presses the valve proper against the seat W. The inner end of the valve stem projects loosely into a holder Y' which rests against the inner end of the bore V, while its outer end is upset at $Y^2$ to prevent escape of the plug W' when the parts are separate from the body portion G'. The bore V is connected with the inflating tube H' by a short passage V' so that air from the pump or other inflating medium after passing through the valve and bore is led to the tire. Preferably we provide a cap Z which screws over the end of the needle so as to prevent ingress of dust and other foreign substances when the needle is not in use.

While we have shown several forms of the device, it will be understood that modifications may be made therein without departing from the invention.

What we claim is:—

1. In an inflating device for pneumatic tires, the combination of a tubular member, adapted to bear at its inner end against the exterior of the tire and adapted to extend through a felly of a wheel, and an inflating needle adapted to be inserted through said tubular member through and into the air-containing tube of the tire.

2. In an inflating device for pneumatic tires, the combination of a tubular member, adapted to bear at its inner end against the exterior of the tire and adapted to extend through a felly of a wheel, and having on its inner end a retaining device for a tire shoe, and an inflating needle adapted to be inserted through said tubular member through and into the air-containing tube of the tire.

3. In an inflating device for pneumatic tires, a tubular member adapted to bear at its inner end against the exterior of the air containing tube of the tire, and adapted to receive an inflating needle, said tubular member having on its inner end a retaining device for a tire shoe.

4. In an inflating device for pneumatic tires, the combination of a tubular member, adapted to bear at its inner end against the exterior of the air-containing tube of the tire, and an inflating needle adapted to be inserted through said tubular member through and into the air-containing tube of the tire, and means for retaining said needle in said tubular member.

5. In an inflating device for pneumatic tires, the combination of a tubular member and an inflating needle adapted to be inserted through said tubular member through and into the air-containing tube of the tire, and means for retaining said needle in said tubular member.

6. In an inflating device for pneumatic tires, the combination of a tubular member and an inflating needle having a needle proper eccentrically mounted thereon adapted to be inserted through said tubular member into the air-containing tube of the tire, and means for preventing rotation of said needle proper in said tubular member.

7. In an inflating device for pneumatic tires, the combination of a tubular member and an inflating needle having a needle proper eccentrically mounted thereon adapted to be inserted through said tubular member into the air-containing tube of the tire, and means for retaining said needle proper in a plurality of angular positions in said tubular member.

8. In an inflating device for pneumatic tires, the combination of a tubular member and an inflating needle having a needle proper eccentrically mounted thereon adapted to be inserted through said tubular member into the air-containing tube of the tire, and means for retaining said needle proper in a plurality of angular positions in said tubular member, said means comprising interengaging lugs and slots upon said needle and tubular member.

9. In an inflating device for pneumatic tires, the combination of a tubular member and an inflating needle adapted to be inserted through said tubular member through and into the air-containing tube of the tire, and means for retaining said needle in said tubular member, said means comprising a coupling sleeve adapted to engage said needle and tubular member.

10. In an inflating device for pneumatic tires, the combination of a tubular member and an inflating needle adapted to be inserted through said tubular member through and into the air-containing tube of the tire, and mechanical means for moving said needle longitudinally in said tubular member.

11. In a pneumatic tire, the combination of a rim, an inner air-containing tube, an outer shoe, means for retaining said shoe in engagement with said rim, said means comprising a tubular member, detached from said inner tube, and an inflating needle, said tubular member having an opening through which said inflating needle may be inserted into said inner tube.

12. In an inflating device for pneumatic tires, the combination of a tubular member adapted to bear at its outer end against the exterior of the air-containing tube of the tire and having an opening therethrough to the exterior of said air-containing tube, and an inflating needle having a sharpened perforating point adapted to be inserted through said tubular member into said air-containing tube through the walls thereof.

13. In an inflating device for pneumatic tires, a tubular member adapted to bear at its inner end against the exterior of an air-containing tube, and adapted to have an inflating needle passed therethrough into and through the air tube, and having means for attaching the same to a rim.

In witness whereof, we have hereunto signed our names in the presence of two subscribing witnesses.

MAXIMILIAN CHARLES SCHWEINERT.
HENRY P. KRAFT.

Witnesses:
T. F. WALLACE,
FRED WHITE.